US012192844B2

(12) United States Patent
Coudert et al.

(10) Patent No.: US 12,192,844 B2
(45) Date of Patent: Jan. 7, 2025

(54) CONFIGURATION OF WIRELESS ACCESS NODES BY DISTRIBUTED LEDGERS

(71) Applicant: T-MOBILE INNOVATIONS LLC, Overland Park, KS (US)

(72) Inventors: Oliver Coudert, Arlington, VA (US); Lyle Walter Paczkowski, Mission Hills, KS (US); Bharatwajan Raman, Arlington, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 441 days.

(21) Appl. No.: 17/727,208

(22) Filed: Apr. 22, 2022

(65) Prior Publication Data
US 2023/0345342 A1 Oct. 26, 2023

(51) Int. Cl.
*H04W 60/04* (2009.01)
*H04L 9/00* (2022.01)
*H04W 36/32* (2009.01)
*H04W 84/06* (2009.01)

(52) U.S. Cl.
CPC ............ *H04W 36/322* (2023.05); *H04L 9/50* (2022.05); *H04W 60/04* (2013.01); *H04W 84/06* (2013.01)

(58) Field of Classification Search
CPC ... H04W 84/06; H04W 60/04; H04W 36/322; H04L 2209/80
See application file for complete search history.

(56) References Cited

U.S. PATENT DOCUMENTS

| 9,866,363 | B2 | 1/2018 | Rakib |
| 10,015,791 | B2 | 7/2018 | Akhavan-Saraf et al. |
| 10,028,327 | B2 | 7/2018 | Bhatnagar et al. |
| 10,687,371 | B2 | 6/2020 | Gunasekara et al. |
| 10,812,975 | B1 | 10/2020 | Easwar Prasad et al. |
| 10,897,498 | B1 | 1/2021 | Paczkowski et al. |
| 10,916,845 | B2 | 2/2021 | Tran et al. |
| 10,917,301 | B2 | 2/2021 | Marquardt et al. |
| 10,931,829 | B1 | 2/2021 | Paczkowski et al. |
| 11,115,912 | B1 | 9/2021 | Paczkowski et al. |

(Continued)

OTHER PUBLICATIONS

Patel, et al.; "What's new with the Internet of Things?"; May 10, 2017; pp. 1-13; McKinsey & Company; https://www.mckinsey.com/industries/semiconductors/our-insights/whats-new-with-the-internet-of-things.

(Continued)

*Primary Examiner* — Hassan A Phillips
*Assistant Examiner* — Prenell P Jones

(57) ABSTRACT

A wireless communication system wirelessly transfers a network integration request to a distributed ledger over a communication satellite. The network integration request indicates an access node identifier, ledger credentials, and geographic location. The distributed ledger validates the ledger credentials, and in response, translates the access node identifier and the geographic location into an access node configuration. The distributed ledger transfers the access node configuration to the wireless access node over the communication satellite. Based on the access node configuration, the wireless access node wirelessly registers with a wireless communication network, wirelessly exchanges user data between User Equipment (UEs) and the wireless communication network, and hands-over some of the UEs with neighbor access nodes.

20 Claims, 10 Drawing Sheets

(56) References Cited

U.S. PATENT DOCUMENTS

| | | |
|---|---|---|
| 11,184,446 B2 | 11/2021 | Murphy et al. |
| 2018/0018723 A1* | 1/2018 | Nagla .................. H04L 63/102 |
| 2018/0295546 A1* | 10/2018 | Crawford ............... H04L 67/10 |
| 2019/0297544 A1* | 9/2019 | Crawford .............. H04L 9/0643 |
| 2019/0373521 A1* | 12/2019 | Crawford ............ G06F 16/9024 |
| 2020/0076606 A1* | 3/2020 | Burke .................. H04L 9/3234 |
| 2020/0186607 A1* | 6/2020 | Murphy ................ G06Q 40/12 |
| 2020/0260349 A1* | 8/2020 | Crawford .............. H04L 9/3236 |
| 2021/0243612 A1 | 8/2021 | Kempf et al. |
| 2022/0247678 A1* | 8/2022 | Atwal .................. H04L 45/645 |
| 2023/0337119 A1* | 10/2023 | Sirotkin ............... H04W 48/08 |

OTHER PUBLICATIONS

Wendelken, et al.; "Worldwide and U.S. IoT Cellular Connections Forecast, 2021-2025"; Aug. 2021; 3 Pages; Doc # US47296121; https://www.idc.com/getdoc.jsp?containerId=US47296121.

"Fourteenth Broadband Deployment Report"; Jan. 19, 2021; pp. 836-1125; FCC 21-18; Federal Communications Commission; Washington, D.C.; https://docs.fcc.gov/public/attachments/FCC-21-18A1_Rcd.pdf.

* cited by examiner

CONFIGURATION OF WIRELESS ACCESS NODES BY DISTRIBUTED LEDGERS

TECHNICAL BACKGROUND

Wireless communication networks provide wireless data services to wireless user devices. Exemplary wireless data services include user data messaging, machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), Session Management Functions (SMFs), User Plane Functions (UPFs), and the like.

The wireless communication networks face difficulty when expanding into geographic areas like rural areas and wilderness lands. The amount of wireless user devices and the number of user applications in these geographic areas can vary significantly. Data network connections from the wireless access nodes back to the wireless network cores is also a challenge. Unfortunately, the wireless communication networks do not effectively configure these types of wireless access nodes. Moreover, the wireless communication networks do not efficiently modify these access node configurations.

TECHNICAL OVERVIEW

A wireless communication system wirelessly transfers a network integration request to a distributed ledger over a communication satellite. The network integration request indicates an access node identifier, ledger credentials, and geographic location. The distributed ledger validates the ledger credentials, and in response, translates the access node identifier and the geographic location into an access node configuration. The distributed ledger transfers the access node configuration to the wireless access node over the communication satellite. Based on the access node configuration, the wireless access node wirelessly registers with a wireless communication network, wirelessly exchanges user data between User Equipment (UEs) and the wireless communication network, and hands-over some of the UEs with neighbor access nodes.

DETAILED DESCRIPTION

Figure 1:
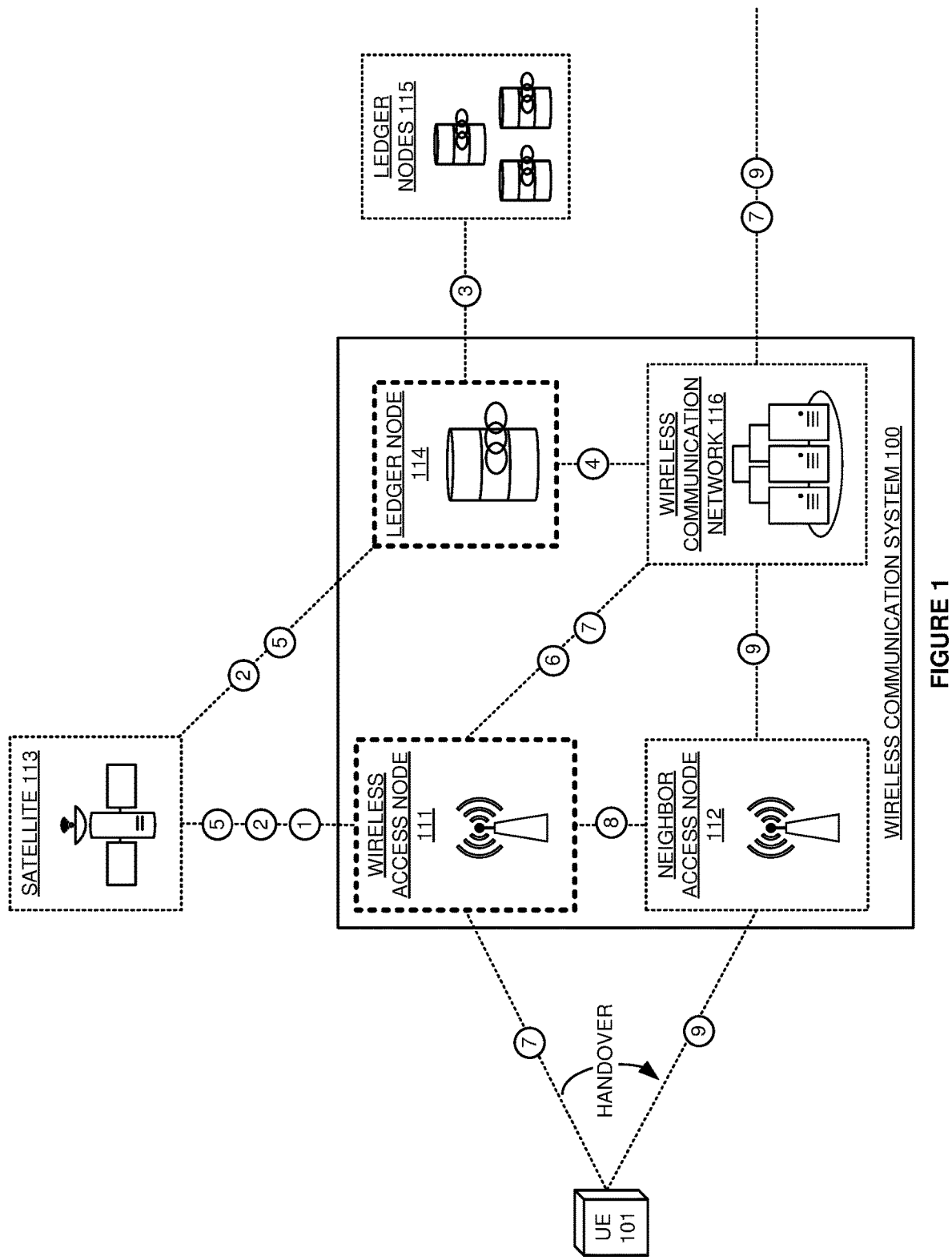
FIG. 1 illustrates an exemplary wireless communication system to configure a wireless access node to wirelessly serve wireless User Equipment (UEs).

FIG. 1 illustrates exemplary wireless communication system 100 to configure wireless access node 111 to wirelessly serve wireless User Equipment (UE) 101. Wireless communication system 100 comprises wireless access nodes 111-112, distributed ledger node 114, and wireless communication network 116. Wireless communication network 116 delivers wireless data services to UE 101 like data messaging, machine-control, internet-access, media-streaming, and social-networking. UE 101 comprises a computer, phone, sensor, vehicle, robot, or some other data appliance with data communication circuitry. Wireless access node 111 stores an access node identifier and ledger credentials. Wireless access node 111 is capable of determining its geographic location. The number of UEs and access nodes shown on FIG. 1 is restricted for clarity and wireless communication system 100 typically includes many more UEs and access nodes than shown.

Various examples of network operation and configuration are described herein, and the following operational sequence is numbered 1-9 on FIG. 1. In this example, wireless access node 111 scans for communication satellite 113 (#1) and wirelessly transfers a network integration request to distributed ledger node 114 over communication satellite 113 (#2). The network integration request indicates the access node identifier, the ledger credentials, and the geographic location. Distributed ledger node 114 receives the network integration request from wireless access node 111 over communication satellite 113. Distributed ledger node 114 validates the ledger credentials-typically by decrypting a digital certificate with a public key and comparing the decrypted content to expected content. In response to the validation, distributed ledger nodes 114-115 translate the access node identifier and the geographic location into an access node configuration for wireless access node 111 (#3). Distributed ledger node 114 notifies wireless communication network 116 of new access node 111 and its configuration (#4). Distributed ledger node 114 transfers the access node configuration to wireless access node 111 over communication satellite 113 (#5). Based on the access node configuration, wireless access node 111 wirelessly registers with wireless communication network 116 (#6). Wireless access node 111 now wirelessly exchanges user data between UE 101 and wireless communication network 116 (#7). Wireless communication network 116 exchanges the user data with external systems (#7). Wireless access node 111 hands-over UE 101 to neighbor access node 112 based on the access node configuration (#8). Wireless access node 112 wirelessly exchanges user data with UE 101 and wirelessly exchanges the user data with wireless communication network 116 (#9). Wireless communication network 116 exchanges the user data with the external systems (#9).

The access node configuration comprises information and instructions to control: UE radio frequency bands, network radio frequency bands, transmit power, geographic restrictions, network contact information, network access credentials, neighbor contact information, UE handover protocol, and the like. Based on the access node configuration, wireless access node 111 wirelessly exchanges data with UE 101 over a specified radio frequency band and wirelessly exchanges the data with wireless communication network 116 over another specified radio frequency band. Based on the access node configuration, wireless access node 111 wirelessly transmits downlink portions of the user data to UE 101 at the transmit power. Based on the access node configuration, wireless access node 111 verifies its geographic location and applies any geographic restrictions before serving UE 101. Based on the access node configuration, wireless access node 111 establishes trusted communications with wireless communication network 116 using the network contact information and network credentials. Based on the access node configuration, wireless access node 111 establishes wireless communications with neighbor access node 112 using the network contact information. Based on the access node configuration, wireless access node 111 wirelessly exchanges hand-over signaling with neighbor access node 112 using the UE handover protocol.

The access node configuration may comprise one or more termination conditions for serving UEs, and wireless access node 111 may determine that its access node configuration is about to terminate per the termination condition. In response, wireless access node 111 wirelessly transfers another integration request to distributed ledger node 114 over wireless communication network 116 (or communication satellite 113). Distributed ledger node 114 translates the access node identifier and the geographic location into a new access node configuration and wirelessly transfers the new access node configuration to wireless access node 111 over wireless communication network 116 (or communication satellite 113). Wireless access node 111 receives the new access node configuration from distributed ledger node 114 and re-registers with wireless communication network 116 based on the new access node configuration. Wireless access node 111 wirelessly exchanges additional user data with UE 101 based on the new access node configuration. Wireless access node 111 wirelessly exchanges the additional user data with wireless communication network 116 based on the new access node configuration. Wireless access node 111 hands-over UE 101 from/to neighbor access node 112 based on the new access node configuration.

Advantageously, wireless communication system 100 effectively configures wireless access node 111—even when node 111 is located in a rural or wilderness area. Moreover, wireless communication system 100 efficiently modifies the access node configuration for wireless access node 111.

UE 101 and wireless access nodes 111-112 comprise radios and wirelessly communicate using a wireless protocols like Fifth Generation New Radio (5GNR), Institute of Electrical and Electronic Engineers (IEEE) 802.11 (WIFI), Long Term Evolution (LTE), Bluetooth Low Energy (BLE), Internet-of-Things (IoT), and Low-Power Wide Area Network (LP-WAN). UE 101, access nodes 111-112, satellite 113, ledger nodes 114-115, and wireless communication network 116 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication system 100 as described herein.

Figure 2:
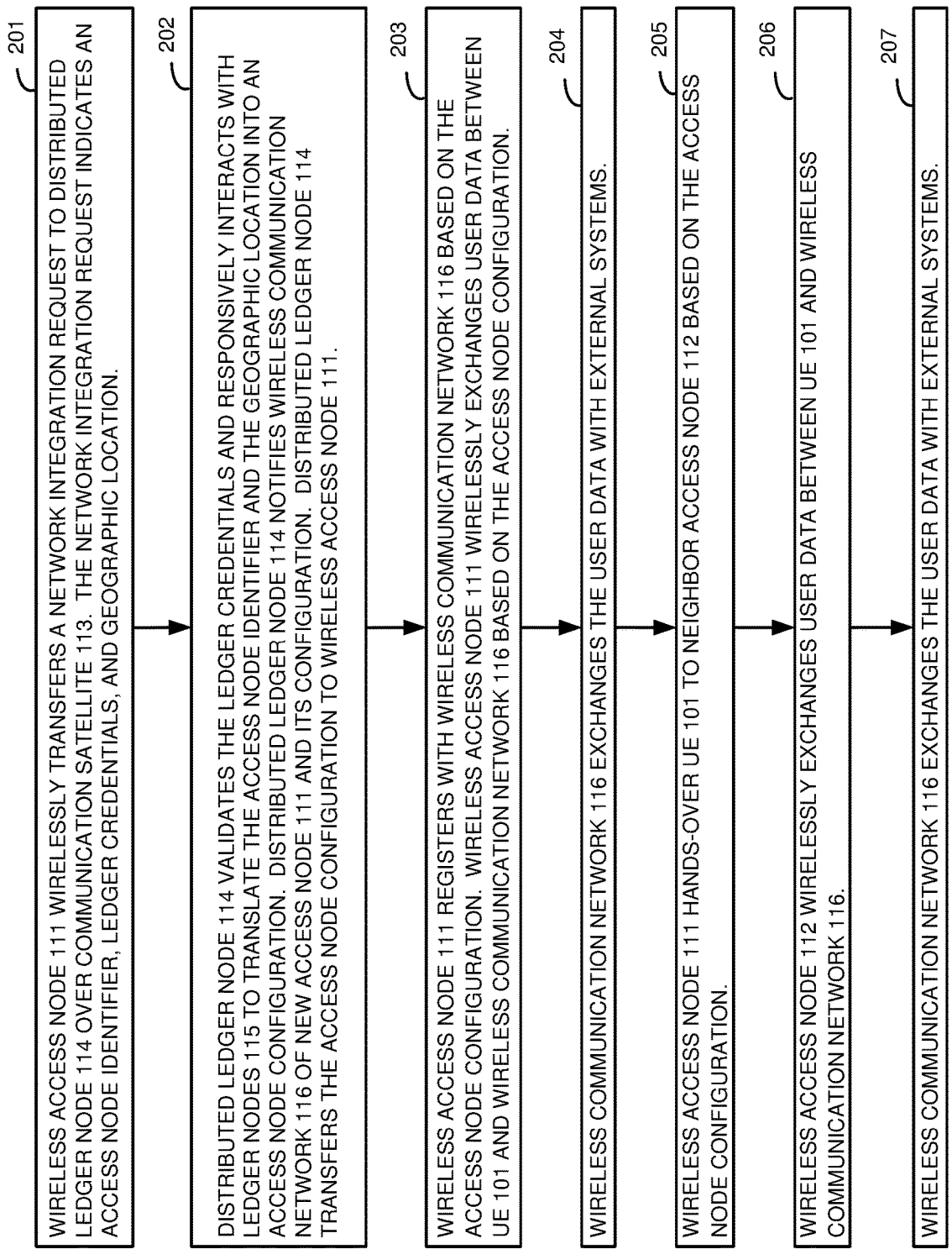
FIG. 2 illustrates an exemplary operation of the wireless communication system to configure the wireless access node to wirelessly serve the wireless UEs.

FIG. 2 illustrates an exemplary operation of wireless communication system 100 to configure wireless access node 111 to wirelessly serve wireless UE 101. The operation may differ in other examples. Wireless access node 111 wirelessly transfers a network integration request to distributed ledger node 114 over communication satellite 113 (201). The network integration request indicates an access node identifier, ledger credentials, and geographic location. Distributed ledger node 114 validates the ledger credentials and responsively interacts with ledger nodes 115 to translate the access node identifier and the geographic location into an access node configuration (202). Distributed ledger node 114 notifies wireless communication network 116 of new access node 111 and its configuration (202). Distributed ledger node 114 transfers the access node configuration to wireless access node 111 over communication satellite 113 (202). Based on the access node configuration, wireless access node 111 wirelessly registers with wireless communication network 116 (203). Wireless access node 111 wirelessly exchanges user data with UE 101 and wirelessly exchanges the user data with wireless communication network 116 (203). Wireless communication network 116 exchanges the user data with external systems (204). Wireless access node 111 hands-over UE 101 to neighbor access node 112 based on the access node configuration (205). Neighbor access node 112 wirelessly exchanges user data between UE 101 and wireless communication network 116 (206). Wireless communication network 116 exchanges the user data with the external systems (207).

Figure 3:
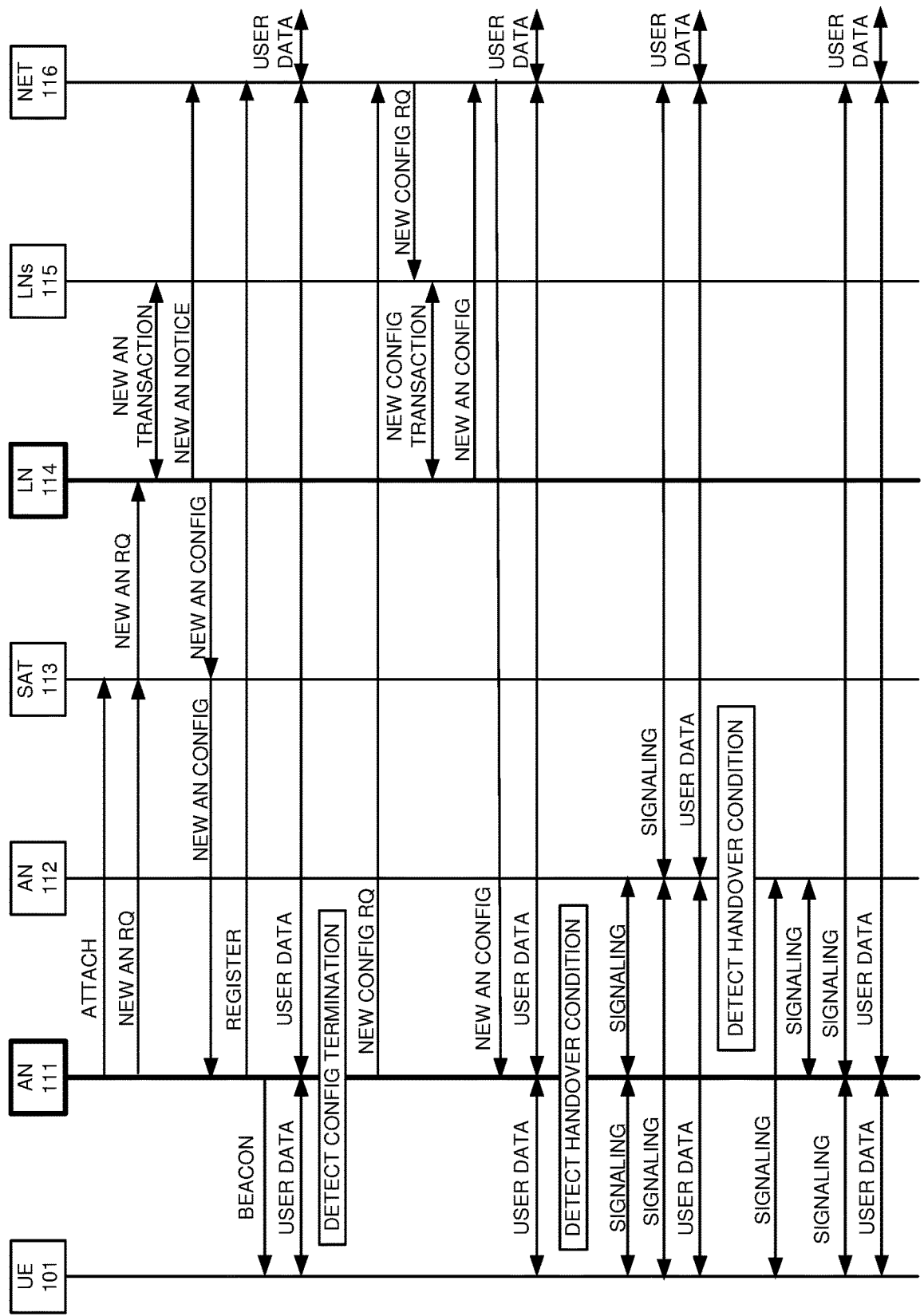
FIG. 3 illustrates an exemplary operation of the wireless communication system to configure the wireless access node to wirelessly serve the wireless UEs.

FIG. 3 illustrates an exemplary operation of wireless communication system 100 to configure wireless access node 111 to wirelessly serve wireless UE 101. The operation may differ in other examples. Wireless access node (AN) 111 attaches to communication satellite (SAT) 113 and wirelessly transfers a new AN request to distributed ledger node (LN) 114 over communication satellite 113. The new AN request indicates the AN identifier, ledger credentials, and geographic location. Distributed ledger node 114 validates the ledger credentials typically by decrypting a digital certificate with a public key of network 116 and comparing the decrypted content to expected content. In response to the validation, distributed ledger nodes 114-115 perform a new AN transaction that translates the access node identifier and the geographic location into an access node configuration per a common data structure. Distributed ledger node 114 notifies wireless communication network 116 of new access node 111 and its configuration. Distributed ledger node 114 transfers the access node configuration to wireless access node 111 over communication satellite 113. Based on the access node configuration, wireless access node 111 wirelessly registers with wireless communication network 116. Wireless access node 111 starts broadcasting a beacon signal based on the AN configuration and in response the network registration. In response to the beacon signal, wireless access node 111 wirelessly exchanges user data between UE 101 and wireless communication network 116. Wireless communication network 116 exchanges the user data with external systems.

Wireless access node 111 detects an imminent termination of the access node configuration—possibly due to an amount of elapsed time or an amount of user data. Wireless access node 111 wirelessly transfers a new configuration request to distributed ledger node 114 over wireless communication network 116. The new config request indicates the AN identifier, ledger credentials, and geographic location. Distributed ledger node 114 validates the ledger credentials. In response to the validation, distributed ledger nodes 114-115 perform a new configuration transaction that translates the access node identifier and the geographic location into a new access node configuration. Distributed ledger node 114 wirelessly transfers the new AN configuration to wireless AN 111 over wireless communication network 116 and notifies wireless communication network 116 of the new AN configuration. Based on the access node configuration, wireless access node 111 wirelessly exchanges user data between UE 101 and wireless communication network 116. Wireless communication network 116 exchanges the user data with external systems.

Wireless access node 111 detects a handover condition like signal strength differential. Wireless access node 111 exchanges handover signaling with UE 101 and neighbor access node 112. Neighbor access node 112 exchanges handover signaling with UE 101 and wireless communication network 116. Wireless access node 112 wirelessly exchanges user data between UE 101 and wireless communication network 116. Wireless communication network 116 exchanges the user data with the external systems.

Neighbor access node 112 now detects a handover condition. Neighbor access node 112 exchanges handover signaling with UE 101 and wireless access node 111. Wireless access node 112 exchanges handover signaling with UE 101 and wireless communication network 116. Wireless access node 112 wirelessly exchanges user data between UE 101 and wireless communication network 116. Wireless communication network 116 exchanges the user data with the external systems.

Figure 4:
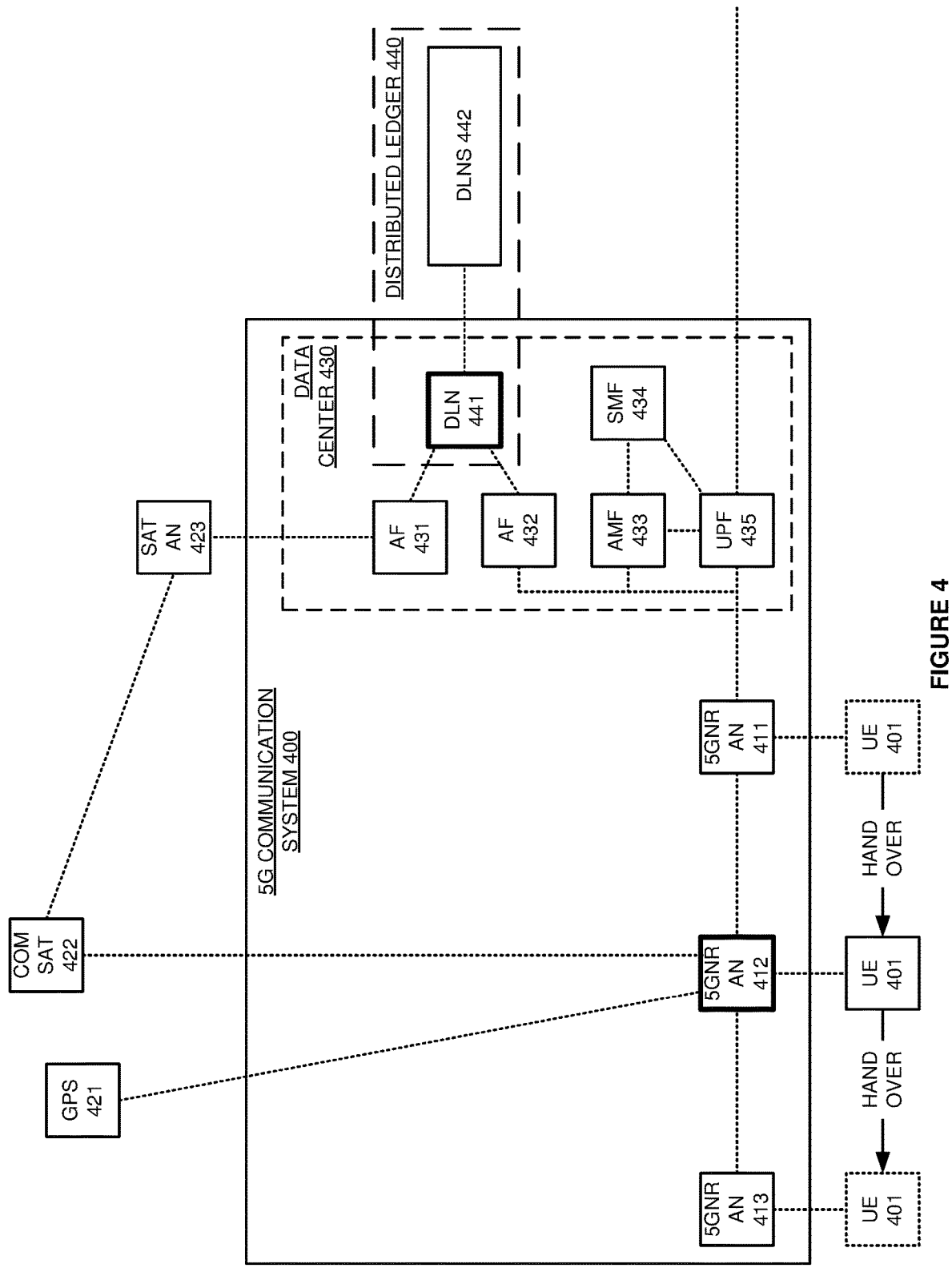
FIG. 4 illustrates an exemplary Fifth Generation (5G) communication system to configure a 5G New Radio (NR) Access Node (AN) to wirelessly serve wireless UEs.

FIG. 4 illustrates exemplary Fifth Generation (5G) communication system 400 to configure 5G New Radio (NR) Access Node (AN) 412 to wirelessly serve wireless UE 401. 5G communication system 400 comprises an example of wireless communication system 100, although system 100 may differ. 5G communication system 400 comprises: 5GNR ANs 411-413 and network data center 430. Network data center 430 comprises Application Functions (AFs) 431-432, Access and Mobility Management Function (AMF) 433, Session Management Function (SMF) 434, User Plane Function (UPF) 435, and Distributed Ledger Node (DLN) 441. Network data center 430 typically includes additional network functions like Network Repository Function (NRF) that are omitted for clarity.

5GNR AN 412 stores its own AN ID, satellite information, and ledger credentials. In response to power, 5GNR AN 412 scans for COM SAT 422 based on the satellite information. 5GNR AN 412 receives and processes signals from GPS 421 to determine its geographic location. 5GNR AN 412 wirelessly transfers a network integration request to AF 431 over COM SAT 422 and SAT AN 423. The network integration request indicates the AN ID, geographic location, and ledger credentials. AF 431 verifies the ledger credentials by decoding them with the appropriate key. When the ledger credentials are verified, AF 431 transfers the network integration request to DLN 441. DLNs 441-442 execute a transaction to generate an AN configuration for new 5GNR AN 412. To perform the transaction, smart contracts in DLNs 441-442 enter their local data structures with the AN ID and geographic location, and the data structures yield an AN configuration for 5GNR AN 412. The AN configuration comprises parameters like radio channels, cell identifiers, transmit power, geographic restrictions, network contact information, network credentials, neighbor contact information, and handover protocol.

DLN 441 notifies AF 432 of new 5GNR access node 412 and it's AN configuration. AF 432 transfers this information to AMF 433, a Unified Data Management (UDM), or some other network element. DLN 441 transfers the AN configuration to 5GNR AN 412 over AF 431, SAT AN 423, and COM SAT 422. 5GNR AN 412 receives the AN configuration over AF 431, SAT AN 423, and COM SAT 422.

5GNR AN 412 performs the following tasks based on the AN configuration. 5GNR AN 412 scans for 5GNR AN 411 and registers with AMF 433 over 5GNR AN 411 using network access credentials. 5GNR AN 412 establishes an N2 with AMF 433. 5GNR AN 412 establishes an X2 with 5GNR AN 411. 5GNR AN 412 establishes a secure link to AF 432 over 5GNR AN 411. 5GNR AN 411 accepts the wireless attachment and serves the backhaul requirements of 5GNR AN 413. 5GNR AN 413 registers with AMF 433 over 5GNR AN 412 and 5GNR AN 411. 5GNR AN 412 broadcasts a beacon signal to attract UEs per it's AN configuration.

Initially, UE 401 is wirelessly attached to 5GNR AN 411 and is exchanging data with an external data system over 5GNR AN 411 and UPF 435. Due to UE 401 mobility, UE 401 determines that the beacon signal from 5GNR AN 412 is stronger that the beacon signal from 5GNR 411 and transfers a corresponding measurement report to 5GNR AN 411. 5GNR AN 411 transfer handover signaling to 5GNR AN 412 over the X2 per the AN configuration. 5GNR AN 411 signals UE 401 to handover to 5GNR AN 412, and UE 401 signals 5GNR AN 412. 5GNR AN 412 signals AMF 433 per the AN configuration. AMF 433 signals SMF 434, and SMF 434 signals UPF 435 with handover information. UE 401 is now wirelessly attached to 5GNR AN 412 and is exchanging data with the external data system over 5GNR AN 412, 5GNR AN 411, and UPF 435. Due to UE 401 mobility, UE 401 determines that the beacon signal from 5GNR AN 413 is stronger that the beacon signal from 5GNR 412 and transfers a corresponding measurement report to 5GNR AN 412. 5GNR AN 412 transfers handover signaling to 5GNR AN 413 over the X2 per the AN configuration. 5GNR AN 412 signals UE 401 to handover to 5GNR AN 413, and UE 401 signals 5GNR AN 413. 5GNR AN 413 signals AMF 433. AMF 433 signals SMF 434, and SMF 434 signals UPF 435 with handover information. UE 401 is now wirelessly attached to 5GNR AN 413 and is exchanging data with the external data system over 5GNR 413, 5GNR AN 412, 5GNR AN 411.

Based on the AN configuration, 5GNR AN 412 wirelessly exchanges data with UE 401, 5GNR AN 411, and 5GNR AN 413 over specific radio channels. Based on the AN configuration, 5GNR AN 412 wirelessly transmits downlink portions of the user data to UE 401 at specified transmit powers. Based on the AN configuration, 5GNR AN 412 verifies its geographic location and applies any geographic restrictions before serving UE 401. Based on the AN configuration, 5GNR AN 412 registers with wireless communication network 116 using the network contact information and network credentials. Based on the AN configuration, 5GNR AN 412 establishes X2 communications with neighbor access nodes 411 and 413. Based on the AN configuration, 5GNR AN 412 uses handover protocols and versions that are also supported by 5GNR ANs 411 and 413.

In this example, the AN configuration comprise a termination condition for serving UEs like time, usage, location, or some other condition. 5GNR AN 412 determines when it's AN configuration is near termination per the termination condition. In response, 5GNR AN 412 wirelessly transfers a new configuration request to DLN 441 over 5GNR AN 411 and AF 432 (or over COM SAT 422, SAT AN 423, and AF 431). DLNs 441-442 execute another transaction to generate another configuration for 5GNR AN 412 (or to extend the existing AN configuration). To perform the transaction in DLNs 441-442, smart contracts enter their local data structures with the AN ID and geographic location, and the data structures yield the next AN configuration for 5GNR AN 412. In other examples, the data structures may yield a determination to neither extend nor grant a new AN configuration and to terminate wireless data service from 5GNR AN 412. DLN 441 notifies AF 432 of new 5GNR access node 412 and it's AN configuration. AF 432 may transfer this information to AMF 433, a UDM, or some other network element. DLN 441 transfers the new AN configuration to 5GNR AN 412 over AF 432 and 5GNR AN 411 (or over AF 431, SAT AN 423, and COM SAT 422). Although 5GNR AN 412 uses wireless backhaul in this example, wireless 5GNR AN 412 may have a wireline backhaul interface use wireline backhaul in other examples.

Figure 5:
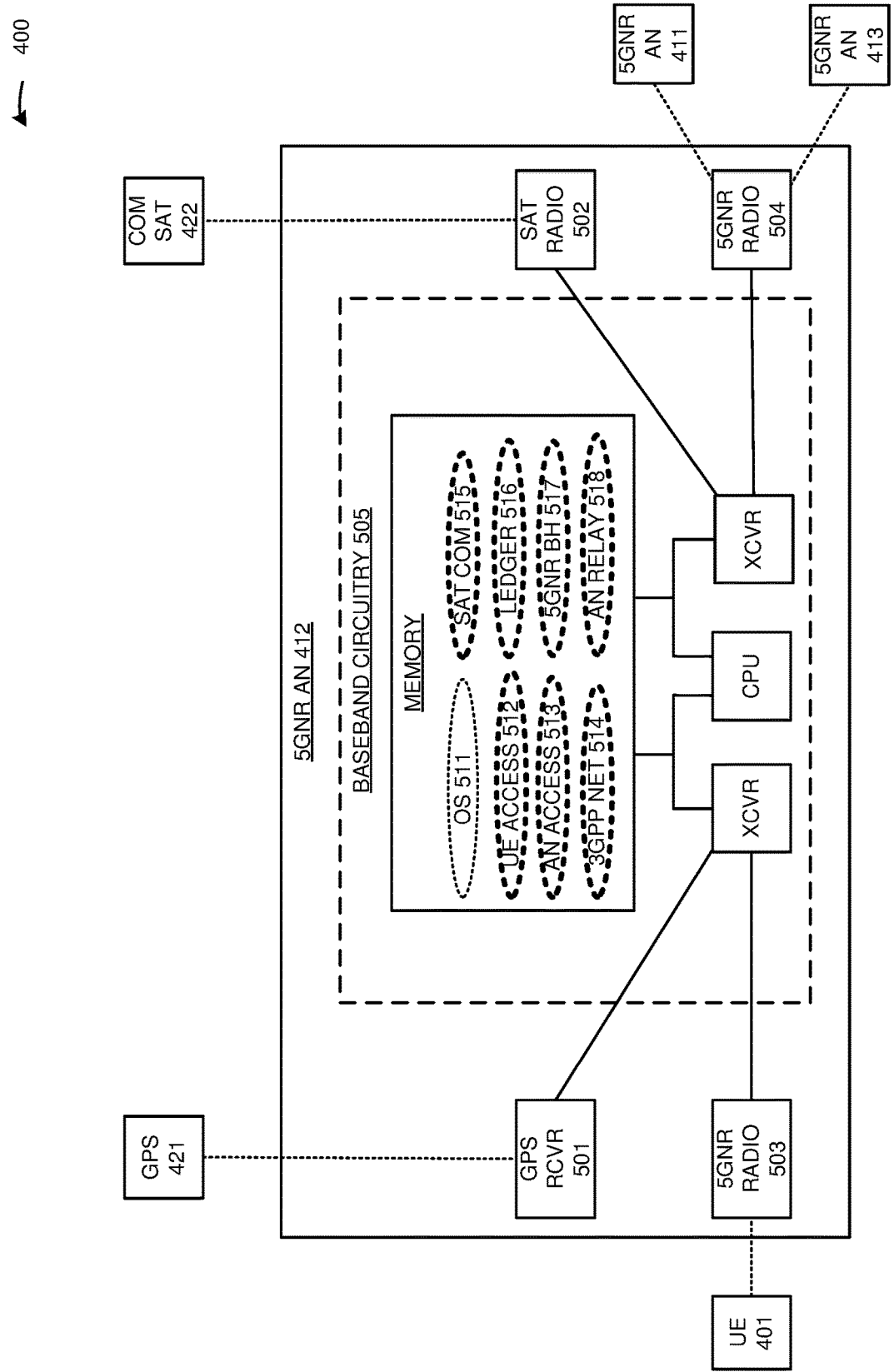
FIG. 5 illustrates an exemplary an 5GNR AN in the 5G communication system.

FIG. 5 illustrates exemplary 5GNR AN 412 in 5G communication system 400. 5GNR AN 412 comprises an example of wireless access nodes 111-112, 411, and 413, although these wireless access nodes may differ. 5GNR AN 412 comprises GPS receiver (RCVR) 501, 5GNR radios 502-504, and baseband circuitry 505. Radios 502-504 comprise antennas, amplifiers, filters, modulation, analog-to-digital interfaces, DSP, memory, radio applications, and transceivers that are coupled over bus circuitry. Baseband circuitry 505 comprises memory, CPU, and transceivers (XCVR) that are coupled over bus circuitry. The memory stores operating system (OS) 511 and the following network applications: UE access 512, AN access 513, 3GPP networking 514, satellite communications 515, ledger interface 516, 5GNR backhaul 517, and AN relay 518. GPS receiver 501 receives time-of-day signals from GPS 421 and determines geographic location. The antennas in SAT radio 502 are wirelessly coupled to wireless UE 401 over a satellite link. The antennas in 5GNR radio 503 are wirelessly coupled to wireless UE 401 over a 5GNR link. The antennas in 5GNR radio 504 are wirelessly coupled to 5GNR ANs 411-413 over 5GNR links. Receiver (RCVR) 501 and radios 502-504 are coupled to transceivers (XCVR) in baseband circuitry 505. The transceivers are coupled to CPU and memory in baseband circuitry 505. The CPU retrieves and executes operating system 511 and network applications 512-518 to operate 5GNR AN 412 as described herein. Although 5GNR AN 412 uses wireless backhaul in this example, wireless 5GNR AN 412 may have a wireline backhaul interface use wireline backhaul in other examples.

Figure 6:
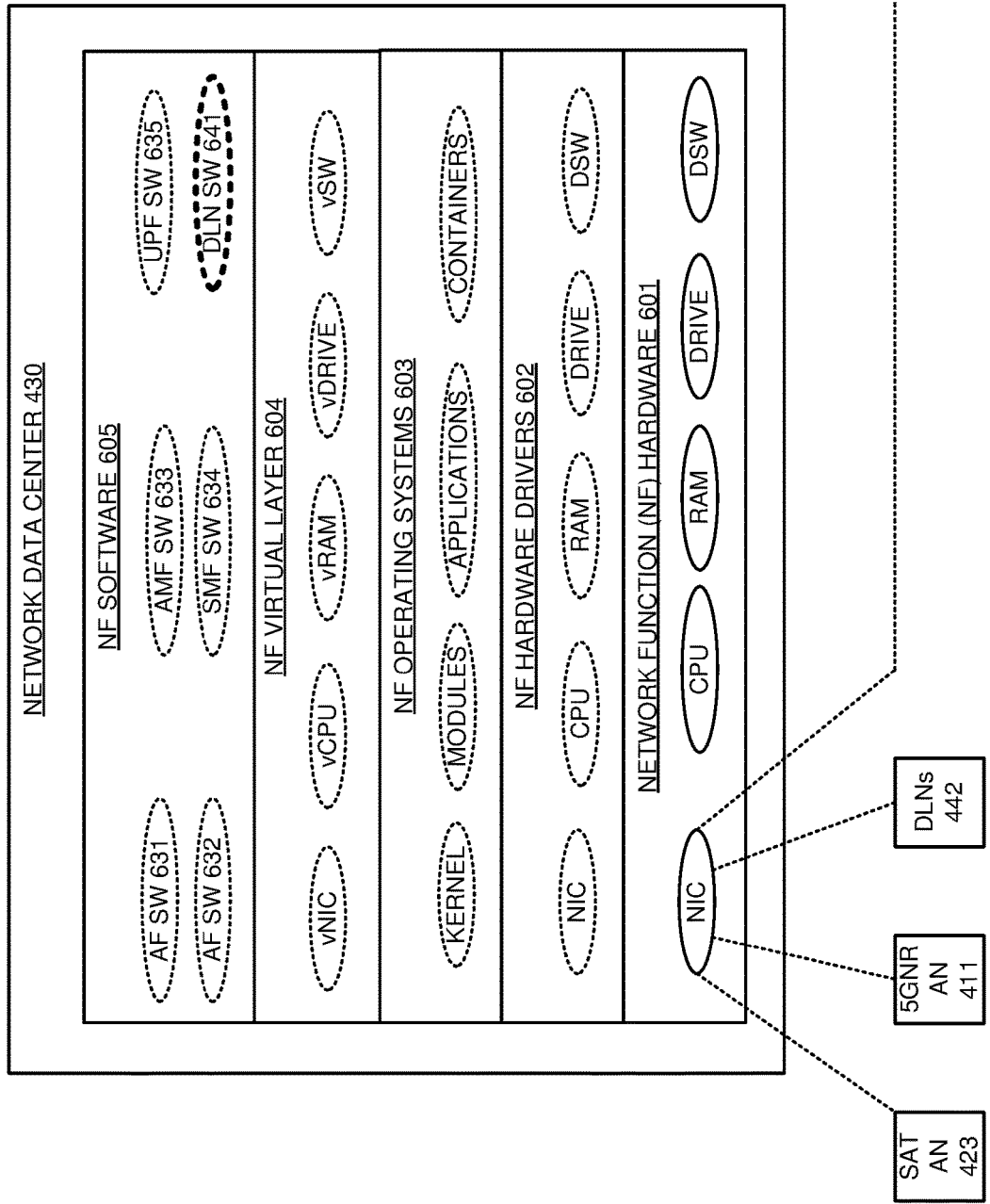
FIG. 6 illustrates an exemplary data center in the 5G communication system.

FIG. 6 illustrates exemplary data center 430 in 5G communication system 400. Network data center 430 comprises Network Function (NF) hardware 601, NF hardware drivers 602, NF operating systems 603, NF virtual layer 604, and NF Software (SW) 605. NF hardware 601 comprises Network Interface Cards (NICs), CPU, RAM, Flash/Disk Drives (DRIVE), and Data Switches (DSW). NF hardware drivers 602 comprise software that is resident in the NIC, CPU, RAM, DRIVE, and DSW. NF operating systems 603 comprise kernels, modules, and applications that form containers for virtual layer and NF software execution. NF virtual layer 604 comprises vNIC, vCPU, vRAM, vDRIVE, and vSW. NF SW 605 comprises AF SW 631-632, AMF SW 633, SMF SW 634, UPF SW 635, and DLN SW 641. Other NF SW like Network Repository Function (NRF) SW is typically present but is omitted for clarity. Network data center 430 may be located at a single site or be distributed across multiple geographic locations. The NIC in NF hardware 601 are coupled to SAT AN 423, 5GNR AN 411, DLNs 442, and external data systems. NF hardware 601 executes NF hardware drivers 602, NF operating systems 603, NF virtual layer 604, and NF SW 605 to form and operate AFs 431-432, AMF 433, SMF 434, UPF 435, and DLN 441 as described herein.

Figure 7:
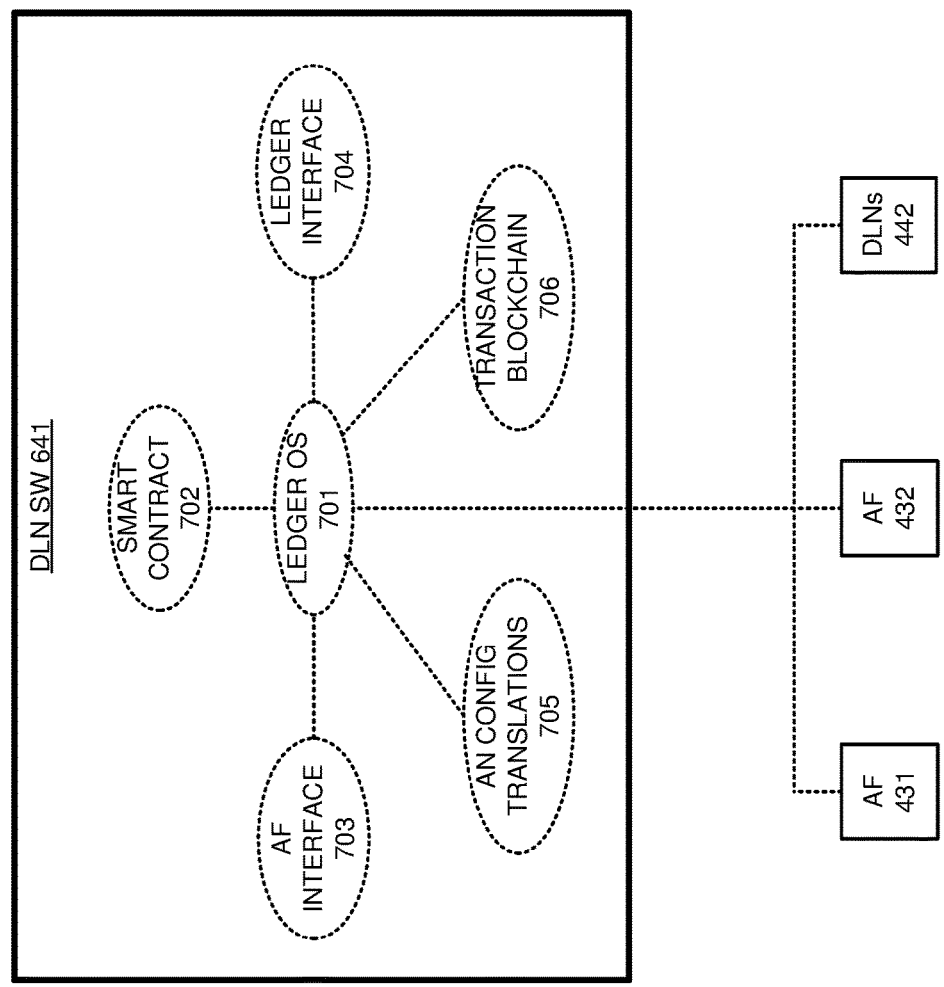
FIG. 7 illustrates an exemplary distributed ledger node in the 5G communication system.

FIG. 7 illustrates exemplary DLN SW 641 in distributed ledger node 441 in 5G communication system 400. DLN SW 641 comprises ledger operating system 701 and the following modules: smart contract 702, AF interface 703, ledger interface 704, AN configuration translations 705, and transaction blockchain 706. Ledger operating system 701 interacts with modules 702-706 and with virtual layer 604 in data center 430 (shown on FIG. 6). AF interface module 703 communicates with AFs 431-432 over OS 701 and AF Application Programming Interfaces (APIs). Ledger interface module 704 communicates with DLNs 442 over OS 701 and secure links. Smart contract 702 receives AN configuration requests from AFs 431-432 over OS 701 and AF interface module 703. Smart contract 704 uses OS 701 and AN configuration translations module 705 to convert AN IDs and locations into AN configurations. Over ledger interface module 704 and OS 701, smart contract 702 proposes AN transactions to DLNs 442 and develops a consensus with DLNs 442 on the transaction results—the AN configurations. Smart contract 702 stores transaction data (AN ID, AN location, AN configuration, date, and time) in transaction blockchain database module 706 over OS 701. Each subsequent data block in the blockchain includes a data hash of the previous data blocks. Smart contract 702 transfers the AN configurations to AFs 431-432 over OS 701 and ledger interface module 704.

Figure 8:
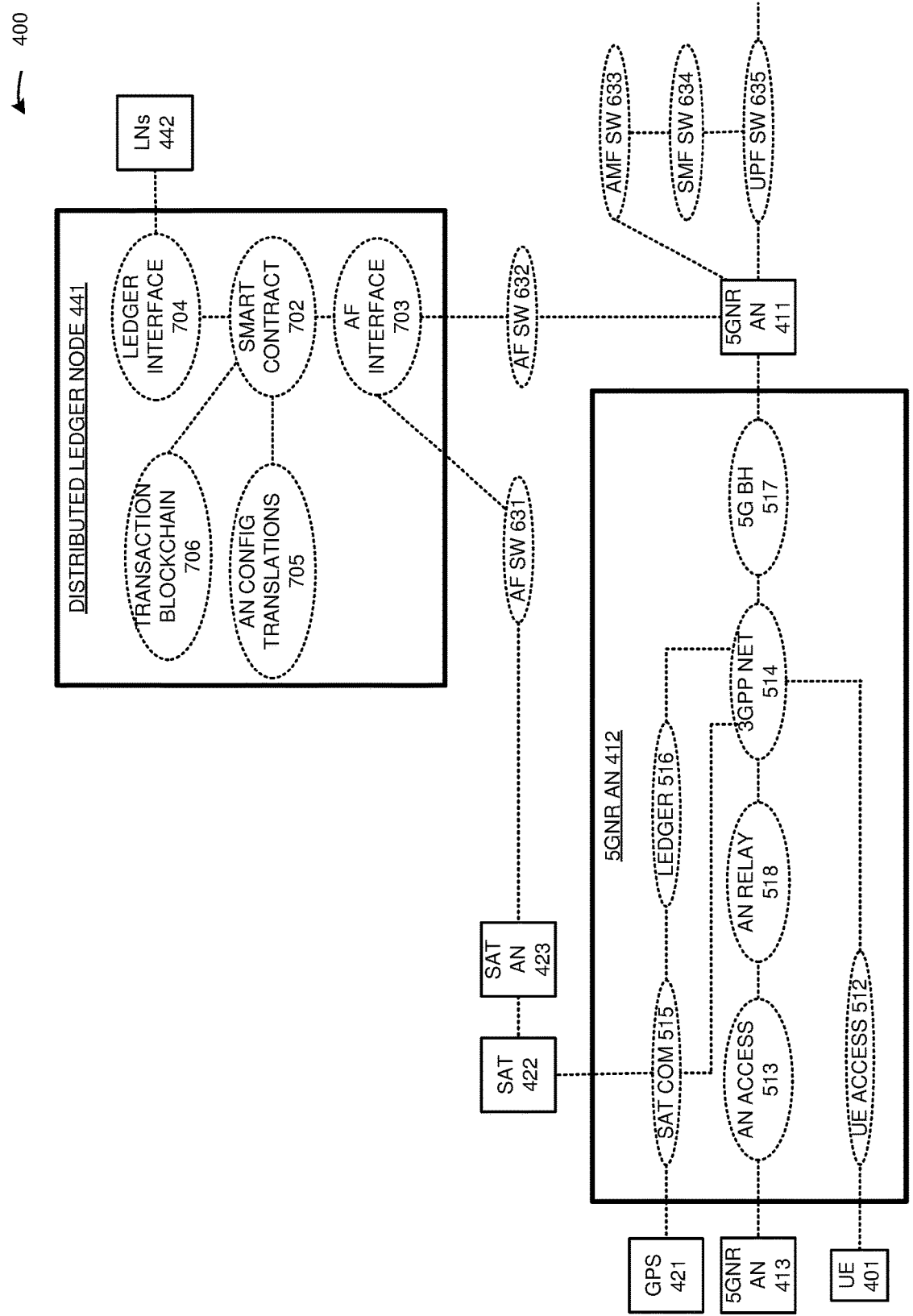
FIG. 8 illustrates an exemplary operation of the 5G communication system to configure the 5GNR access node to wirelessly serve the wireless UE.

FIG. 8 illustrates an exemplary operation of 5G communication system 400 to configure 5GNR AN 412 to wirelessly serve wireless UE 401. The operation may differ in other examples. In response to power, satellite communications module (SAT COM) 515 in 5GNR AN 412 scans for COM SAT 422 based on the stored satellite information. Satellite communications module 515 receives and processes signals from GPS 421 to determine the geographic location of 5GNR AN 412.

Ledger interface module (LEDGER) 516 transfers a network integration request to smart contract module 702 over satellite communications module 515, COM SAT 422, SAT AN 423, AF SW 631, and AF interface module 703. The network integration request indicates the AN ID, geographic location, and ledger credentials. AF SW 631 or AF interface 703 verifies the ledger credentials by decoding them with the appropriate key before allowing ledger access. When the ledger credentials are verified, smart contract 702 receives the network integration request, and in response, smart contract 702 and the smart contracts in DLNs 442 interact over ledger interface module 704 to execute a transaction and generate a configuration for new 5GNR AN 412. To execute the transaction in DLN 441, smart contract 702 enters a AN configuration translations 705 with the AN ID and geographic location, and the translations 705 yields an AN configuration for 5GNR AN 412. The AN configuration comprises parameters like radio channels and cell identifiers for UEs, radio channels and cell identifiers for ANs, transmit power, geographic restrictions and/or permissions, network contact information and credentials, neighbor contact information, and handover protocol. Smart contract module 702 notifies ledger interface module 516 of the new AN configuration for 5GNR AN 412 over AF interface module 703, AF SW 631, SAT AN 423, COM SAT 422, and satellite communications module 515. AF SW 632 may transfer the AN configuration to AMF SW 633, a UDM, or some other network element.

5GNR AN 412 performs the following tasks based on the AN configuration. 5G backhaul module (5G BH) 517 attaches to 5GNR AN 411. 3GPP networking module (NET) 514 registers with AMF SW 633 over 5G backhaul module 517 and 5GNR AN 411. 3GPP networking module 514 establishes an N2 with AMF SW 633. 3GPP networking module 514 establishes an X2 with 5GNR AN 411. Ledger interface module 516 establishes a secure link to smart contract 702 over 3GPP networking module 514, 5G backhaul module 517, 5GNR AN 411, AF SW 632, and AF interface module 703. AN relay module 518 accepts the wireless attachment of 5GNR AN 413 over AN access module 513. 5GNR AN 413 registers with AMF SW 633 over AN access module 513, AN relay module 518, 3GPP network module 514, 5G backhaul module 517, and 5GNR AN 411. UE access module 512 broadcasts a beacon signal to attract UEs like UE 401.

UE 401 wirelessly attaches to 3GPP networking module 514 over UE access module 512. UE 401 registers with AMF SW 633 over UE access module 512, 3GPP networking module 514, 5G backhaul module 517, and 5GNR AN 411. AMF SW 633 signals SMF SW 634 to serve UE 401, and SMF SW 634 signals UPF SW 635 to serve UE 401. AMF SW 633 signals 3GPP networking module 514 over 5GNR AN 411 and 5G backhaul module 517 to serve UE 401. UE 401 exchanges user data with external systems over UE access module 512, 3GPP network module 514, 5G backhaul module 517, 5GNR AN 411, and UPF SW 635.

Figure 9:
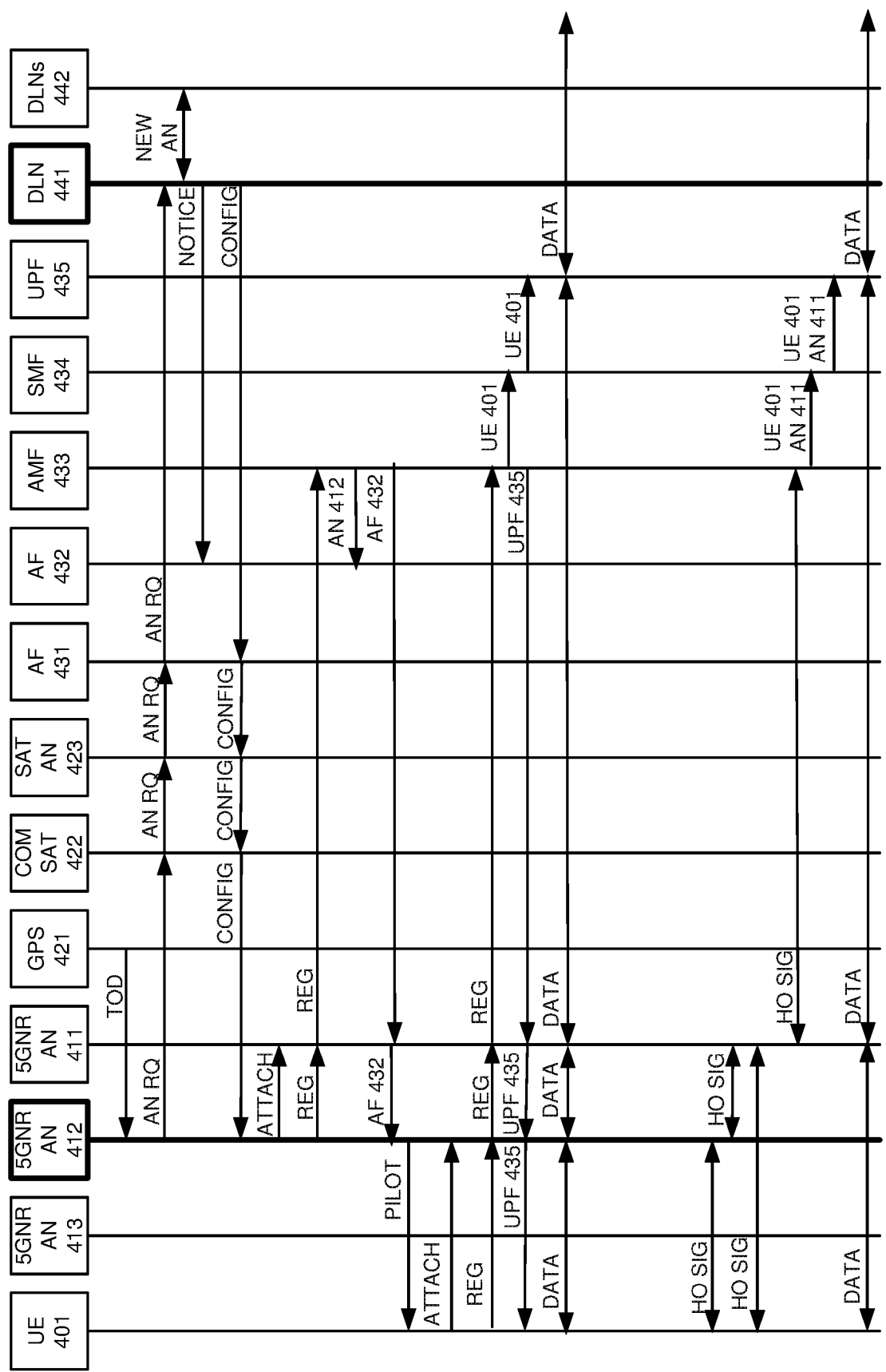
FIG. 9 illustrates an exemplary operation of the 5G communication system to configure the 5GNR access node to wirelessly serve the wireless UE.

FIG. 9 illustrates an exemplary operation of 5G communication system 400 to configure 5GNR AN 412 to wirelessly serve wireless UE 401. The operation may differ in other examples. 5GNR AN 412 receives and processes Time-Of-Day (TOD) signals from GPS 421 to determine its geographic location. 5GNR AN 412 wirelessly transfers a new AN request (RQ) to DLN 441 over COM SAT 422, SAT AN 423, and AF 431. The network integration request indicates the AN ID, geographic location, and ledger credentials. DLN 441 (or AF 431) verifies the ledger credentials by decoding them with the appropriate key.

When the ledger credentials are verified, DLNs 441-442 execute a transaction to generate a configuration for new 5GNR AN 412. DLN 441 notifies AF 432 of new 5GNR access node 412 and the new AN configuration. AF 432 may transfer this information to AMF 433, UDM, or some other network element. DLN 441 transfers the AN configuration to 5GNR AN 412 over AF 431, SAT AN 423, and COM SAT 422. 5GNR AN 412 wirelessly attaches to 5GNR AN 411 and registers with AMF 433 over 5GNR AN 411. AMF 433 signals AF 432 to serve 5GNR AN 412. AMF 433 signals 5GNR AN 412 to use AF 432 for ledger access.

5GNR AN 412 broadcasts a pilot signal per it's AN configuration, but 5GNR AN 412 will not broadcast the pilot signal (nor serve UEs) without a valid and current AN configuration. UE 401 wirelessly attaches to 5GNR AN 412 responsive to the pilot signal. UE 401 registers with AMF 433 over 5GNR AN 412 and 5GNR AN 411. AMF 433 signals SMF 434 to serve UE 401 over 5GNR AN 412. SMF 434 signals 5GNR UPF 435 to serve UE 401 over 5GNR AN 412. AMF 433 signals 5GNR AN 412 (over AN 411) to serve UE 401 over UPF 435. AMF 433 signals UE 401 to use UPF 435 over 5GNR AN 412. UE 401 and an external data system exchange user data over 5GNR AN 412, 5GNR AN 411, and UPF 435.

Due to UE 401 mobility, UE 401 determines that the pilot signal from 5GNR AN 411 is stronger that the pilot signal from 5GNR 412 and transfers a corresponding measurement report to 5GNR AN 412. 5GNR AN 412 determines to handover UE 401 to 5GNR AN 411 and signals UE 401 to handover to 5GNR AN 411. 5GNR AN 412 transfers handover signaling to 5GNR AN 411 over the X2 per the AN configuration. UE 401 signals 5GNR AN 411. 5GNR AN 411 signals AMF 433. AMF 433 signals SMF 434, and SMF 434 signals UPF 435 with handover information. UE 401 exchanges user data with the external data system over 5GNR 411 and UPF 435. The operation proceeds to FIG. 10.

Figure 10:
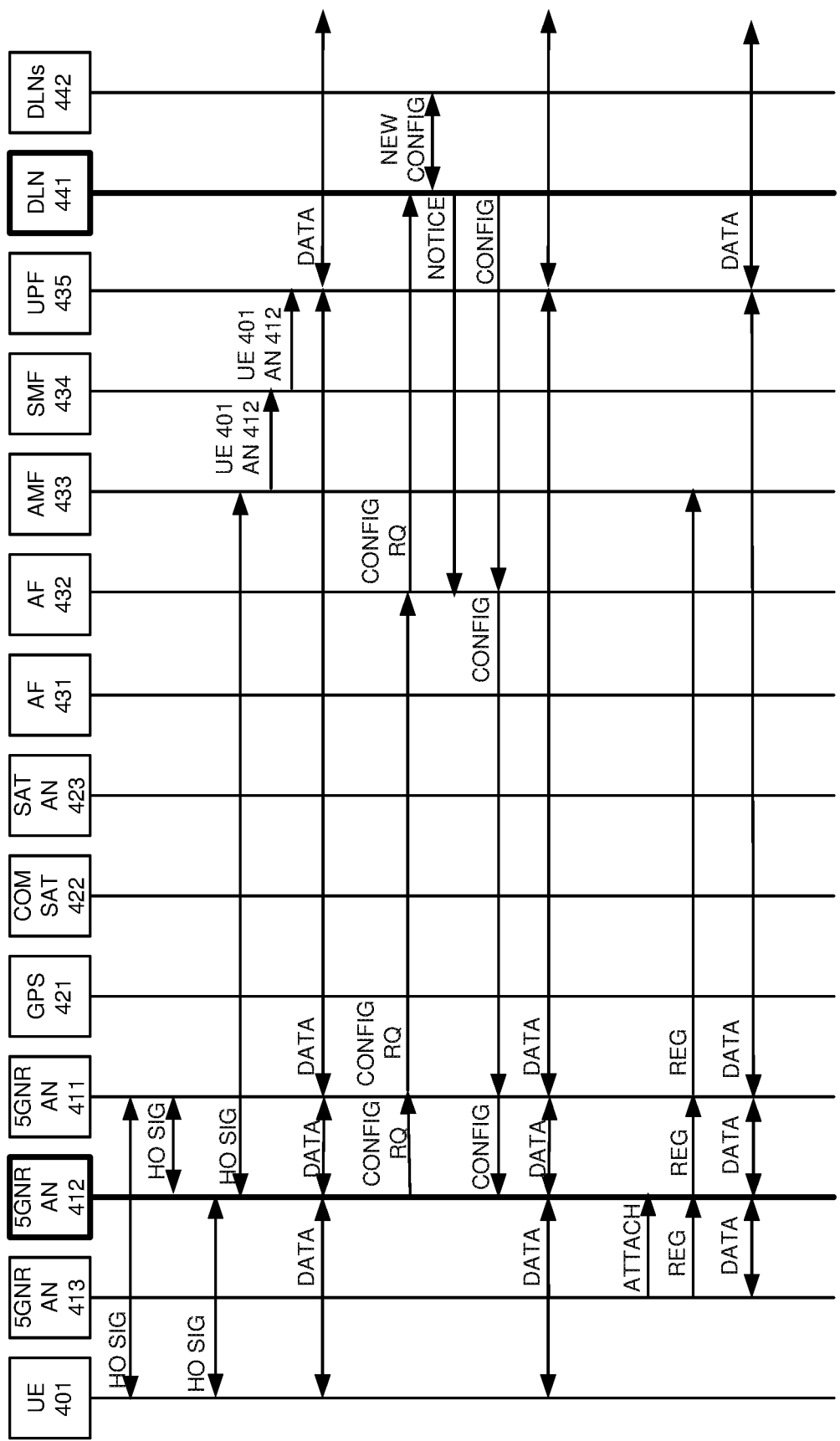
FIG. 10 illustrates an exemplary operation of the 5G communication system to configure the 5GNR access node to wirelessly serve the wireless UE.

FIG. 10 illustrates an exemplary operation of 5G communication system 400 to configure 5GNR AN 412 to wirelessly serve wireless UE 401. The operation may differ in other examples. The operation continues from FIG. 9. Due to UE 401 mobility, UE 401 determines that the pilot signal from 5GNR AN 412 is stronger that the pilot signal from 5GNR 411 and transfers a corresponding measurement report to 5GNR AN 411. 5GNR AN 411 determines to handover UE 401 back to 5GNR AN 412 and signals UE 401 to handover to 5GNR AN 412. 5GNR AN 411 transfers handover signaling to 5GNR AN 412 over the X2 per the AN configuration. UE 401 signals 5GNR AN 412. 5GNR AN 412 signals AMF 433. AMF 433 signals SMF 434, and SMF 434 signals UPF 435 with handover information. UE 401 exchanges user data with the external data system over 5GNR AN 512, 5GNR 411, and UPF 435 pr the AN configuration.

The AN configuration comprise a termination condition based on time. Just before expiry, 5GNR AN 412 wirelessly transfers another integration request to DLN 441 over 5GNR AN 411 and AF 432 (or over COM SAT 422, SAT AN 423, and AF 431). DLNs 441-442 execute another transaction to generate a new configuration for new 5GNR AN 412, extend the existing configuration, or terminate the AN configuration and service. In this example, DLN 441 transfers a new AN configuration to 5GNR AN 412 over AF 432 and 5GNR access node 411. AF 432 may transfer this information to AMF 433, a UDM, or some other network element. Based on the new AN configuration, UE 401 exchanges user data with the external data system over 5GNR AN 512, 5GNR 411, and UPF 435. Without the new AN configuration, 5GNR AN 512 would not have served UE 401 after AN configuration expiry.

5GNR AN 413 wirelessly attaches to 5GNR AN 412 based on their AN configurations. 5GNR AN 413 registers with AMF 433 over 5GNR AN 412 and 5GNR AN 411. 5GNR AN 413 exchanges user data for its UEs (not shown) with external data systems over 5GNR AN 412, 5GNR AN 411, and UPF 435.

The wireless data network circuitry described above comprises computer hardware and software that form special-purpose wireless communication circuitry to configure wireless access nodes to serve wireless UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless communication circuitry to configure wireless access nodes to serve wireless UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to configure a wireless access node to wirelessly serve wireless User Equipment (UEs), the method comprising:

the wireless access node storing an access node identifier, storing ledger credentials, determining a geographic location of the wireless access node, scanning for a communication satellite, and wirelessly transferring a network integration request to a distributed ledger node over the communication satellite, wherein the network integration request indicates the access node identifier, the ledger credentials, and the geographic location;

the distributed ledger node receiving the network integration request from the wireless access node over the communication satellite and validating the ledger credentials, and in response, translating the access node identifier and the geographic location into an access node configuration and transferring the access node configuration to the wireless access node over the communication satellite; and the wireless access node wirelessly receiving the access node configuration from the distributed ledger node over the communication satellite, and based on the access node configuration, wirelessly registering with a wireless communication network, wirelessly exchanging user data with the UEs, wirelessly exchanging the user data with the wireless communication network, and handing-over some of the UEs to a neighbor access node.

2. The method of claim 1 wherein:

the access node configuration comprises a radio frequency band for the wireless exchange of the user data with the UEs; and the wireless access node wirelessly exchanging the user data with the UEs based on the access node configuration comprises wirelessly exchanging the user data with the UEs over the radio frequency band.

3. The method of claim 1 wherein:

the access node configuration comprises a radio frequency band for the wireless exchange of the user data with the wireless communication network; and the wireless access node wirelessly exchanging the user data with the wireless communication network based on the access node configuration comprises wirelessly exchanging the user data with the wireless communication network over the radio frequency band.

4. The method of claim 1 wherein:

the access node configuration comprises a transmit power for the wireless exchange of the user data with the UEs; and the wireless access node wirelessly exchanging user data with the UEs based on the access node configuration comprises wirelessly transmitting downlink portions of the user data to the UEs at the transmit power.

5. The method of claim 1 wherein:

the access node configuration comprises a geographic restriction for the wireless exchange of the user data with the UEs; and the wireless access node wirelessly exchanging the user data with the UEs based on the access node configuration comprises determining a geographic location of the wireless access node, and in response, wirelessly exchanging the user data with the UEs per the geographic restriction for the geographic location.

6. The method of claim 1 wherein:

the access node configuration comprises contact information for the wireless communication network; and the wireless access node registering with the wireless communication network based on the access node configuration comprises establishing communications with the wireless communication network using the contact information.

7. The method of claim 1 wherein:

the access node configuration comprises network credentials for the wireless communication network; and the wireless access node registering with the wireless communication network based on the access node configuration comprises transferring the network credentials to the wireless communication network.

8. The method of claim 1 wherein:

the access node configuration comprises neighbor access node contact information; and the wireless access node handing-over some of the UEs to the neighbor access node based on the access node configuration comprises establishing wireless communications with the neighbor access node using the contact information.

9. The method of claim 1 wherein:
the access node configuration comprises a UE handover protocol; and
the wireless access node handing-over some of the UEs to the neighbor access node based on the access node configuration comprises wirelessly exchanging handover signaling with the neighbor access node using the UE handover protocol.

10. The method of claim 1 wherein the access node configuration comprises a termination condition for the wireless exchange of the user data with the UEs and further comprising:
the wireless access node determining that the access node configuration is approaching termination per the termination condition, and in response, wirelessly transferring another integration request to the distributed ledger node;
the distributed ledger node receiving the other integration request from the wireless access node, and in response, translating the access node identifier and the geographic location into a new access node configuration and wirelessly transferring the new access node configuration to the wireless access node; and
the wireless access node receiving the new access node configuration from the distributed ledger node, and in response, exchanging additional user data with the UEs based on the new access node configuration, wirelessly exchanging the additional user data with the wireless communication network based on the new access node configuration, and handing-over some of the UEs to the neighbor access node based on the new access node configuration.

11. A method of operating a wireless communication system to configure a wireless access node to wirelessly serve wireless User Equipment (UEs), the wireless communication system comprising:
the wireless access node configured to store an access node identifier, store ledger credentials, determine a geographic location of the wireless access node, scan for a communication satellite, and wirelessly transfer a network integration request to a distributed ledger node over the communication satellite, wherein the network integration request indicates the access node identifier, the ledger credentials, and the geographic location;
the distributed ledger node configured to receive the network integration request from the wireless access node over the communication satellite and validate the ledger credentials, and in response, translate the access node identifier and the geographic location into an access node configuration and transfer the access node configuration to the wireless access node over the communication satellite; and
the wireless access node configured to wirelessly receive the access node configuration from the distributed ledger node over the communication satellite, and based on the access node configuration, wirelessly register with a wireless communication network, wirelessly exchange user data with the UEs, wirelessly exchange the user data with the wireless communication network, and hand-over some of the UEs to a neighbor access node.

12. The wireless communication system of claim 11 wherein:
the access node configuration comprises a radio frequency band for the wireless exchange of the user data with the UEs; and
the wireless access node is configured to wirelessly exchange the user data with the UEs over the radio frequency band to wirelessly exchange the user data with the UEs based on the access node configuration.

13. The wireless communication system of claim 11 wherein:
the access node configuration comprises a radio frequency band for the wireless exchange of the user data with the wireless communication network; and
the wireless access node is configured to wirelessly exchange the user data with the wireless communication network over the radio frequency band to wirelessly exchange the user data with the wireless communication network based on the access node configuration.

14. The wireless communication system of claim 11 wherein:
the access node configuration comprises a transmit power for the wireless exchange of the user data with the UEs; and
the wireless access node is configured to wirelessly transmit downlink portions of the user data to the UEs at the transmit power to wirelessly exchange the user data with the UEs based on the access node configuration.

15. The wireless communication system of claim 11 wherein:
the access node configuration comprises a geographic restriction for the wireless exchange of the user data with the UEs; and
the wireless access node is configured to determine a geographic location of the wireless access node, and in response, wirelessly exchange the user data with the UEs at the geographic location per the geographic restriction for the geographic location to wirelessly exchange the user data with the UEs based on the access node configuration.

16. The wireless communication system of claim 11 wherein:
the access node configuration comprises contact information for the wireless communication network; and
the wireless access node is configured to establish communications with the wireless communication network using the contact information to register with the wireless communication network based on the access node configuration.

17. The wireless communication system of claim 11 wherein:
the access node configuration comprises network credentials for the wireless communication network; and
the wireless access node is configured to transfer the network credentials to the wireless communication network to register with the wireless communication network based on the access node configuration.

18. The wireless communication system of claim 11 wherein:
the access node configuration comprises neighbor access node contact information; and
the wireless access node is configured to establish wireless communications with the neighbor access node using the contact information to hand-over some of the UEs to the neighbor access node based on the access node configuration.

19. The wireless communication system of claim 11 wherein:

the access node configuration comprises a UE handover protocol; and the wireless access node is configured to wirelessly exchange hand-over signaling with the neighbor access node using the UE handover protocol to hand-over some of the UEs to the neighbor access node based on the access node configuration.

20. The wireless communication system of claim 11 wherein the access node configuration comprises a termination condition for the wireless exchange of the user data with the UEs and further comprising:

the wireless access node configured to determine that the access node configuration is approaching termination per the termination condition, and in response, wirelessly transfer another integration request to the distributed ledger node;

the distributed ledger node configured to receive the other integration request from the wireless access node, and in response, translate the access node identifier and the geographic location into a new access node configuration and transfer the new access node configuration to the wireless access node; and the wireless access node configured to receive the new access node configuration from the distributed ledger node, and in response, wirelessly exchange additional user data with the UEs based on the new access node configuration, wirelessly exchange the additional user data with the wireless communication network based on the new access node configuration, and hand-over some of the UEs to the neighbor access node based on the new access node configuration.

* * * * *